United States Patent [19]

Murase

[11] Patent Number: 5,793,748
[45] Date of Patent: Aug. 11, 1998

[54] PRIORITY CONTROL METHOD OF VIRTUAL CIRCUIT AND A DEVICE THEREOF

[75] Inventor: Tutomu Murase, Tokyo, Japan

[73] Assignee: NEC Corporation, Tokyo, Japan

[21] Appl. No.: 492,996

[22] Filed: Jun. 21, 1995

[30] Foreign Application Priority Data

Jun. 21, 1994 [JP] Japan .................................. 6-138830

[51] Int. Cl.[6] ................................................ H04J 3/16
[52] U.S. Cl. ................................ 370/235; 370/417
[58] Field of Search ...................... 370/60, 60.1, 61,
370/94.1, 85.6, 13, 17, 58.1, 58.2, 58.3,
54, 399, 397, 229, 230, 231, 232, 233,
234, 235, 236, 237, 238, 252, 412, 413,
414, 415, 416, 417, 418, 409, 465, 468,
444, 455, 522, 473, 428, 429; 395/877,
872, 200.13

[56] References Cited

U.S. PATENT DOCUMENTS

| | | | |
|---|---|---|---|
| 5,390,299 | 2/1995 | Rege et al. | 395/877 |
| 5,394,396 | 2/1995 | Yoshimura | 370/60 |
| 5,452,296 | 9/1995 | Shimizu | 370/399 |
| 5,499,238 | 3/1996 | Shon | 370/60.1 |
| 5,528,763 | 6/1996 | Serpanos | 370/60 |
| 5,530,698 | 6/1996 | Kozaki et al. | 370/60 |

FOREIGN PATENT DOCUMENTS 3-22736  1/1991  Japan .................... H04L 12/56

*Primary Examiner*—Huy D. Vu
*Attorney, Agent, or Firm*—Foley & Lardner

[57] ABSTRACT

The present invention monitors the state of utilization of a buffer and a cell that has been disposed. Based on this monitoring information, it selects a virtual circuit to be given lower priority order to input it into the buffer in lower priority order.

15 Claims, 6 Drawing Sheets

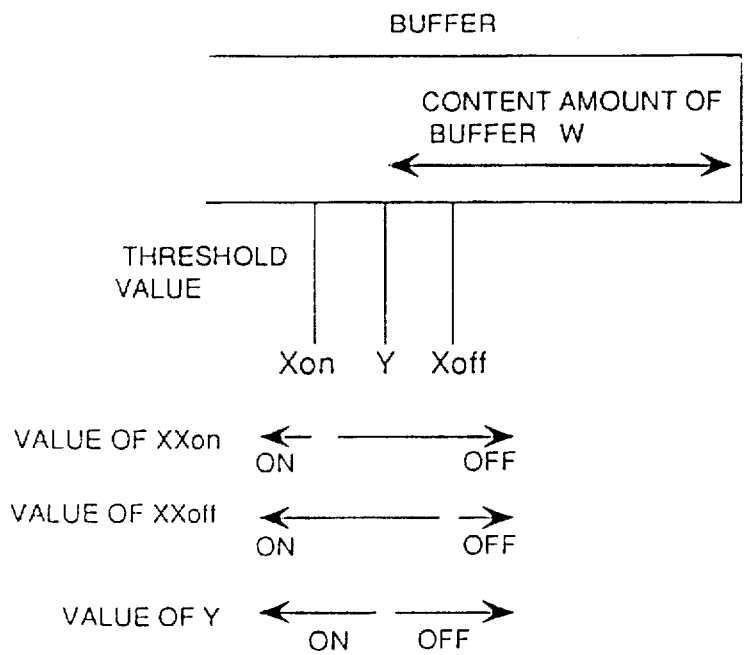

FIG.5
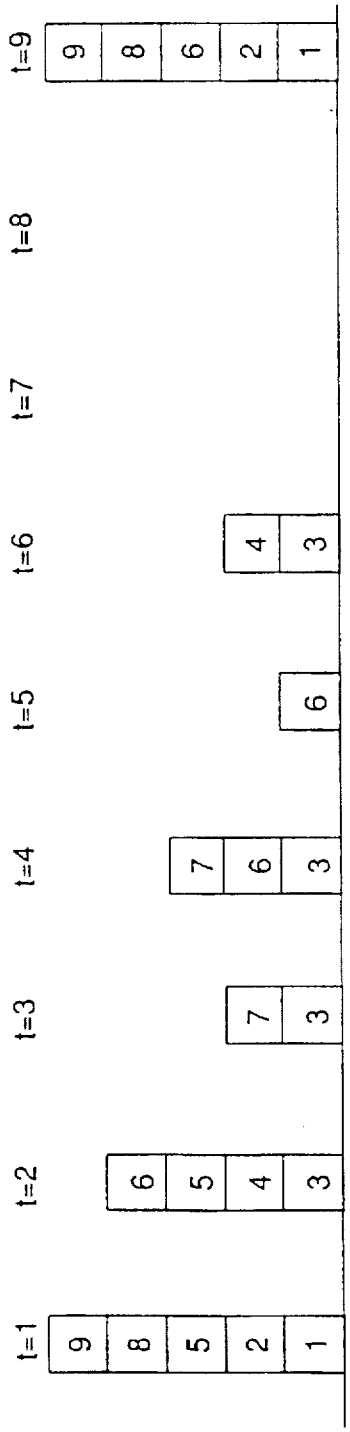
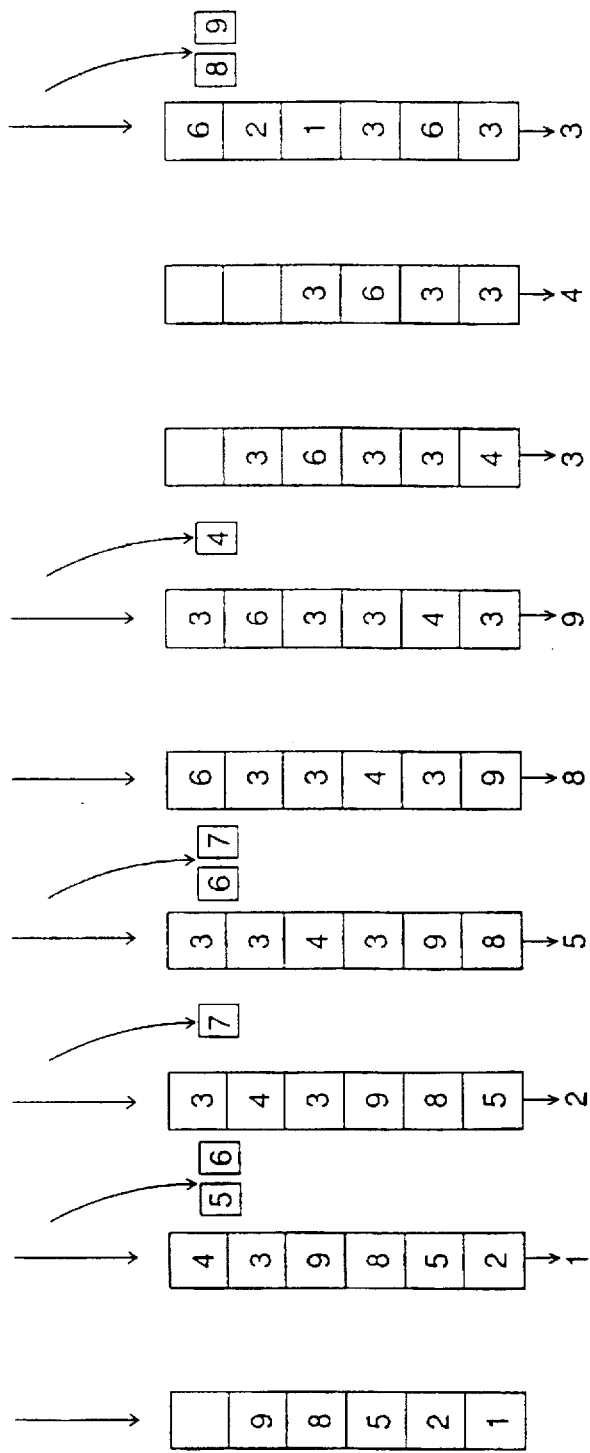

PRIORITY CONTROL METHOD OF VIRTUAL CIRCUIT AND A DEVICE THEREOF

BACKGROUND OF THE INVENTION

This invention relates to an art for controlling priority of virtual circuits in a communication network of a packet switching system.

With the packet switching system, a statistical load variation is likely to cause a buffer overflow at multi-switching owing to an instantaneous overload.

An asynchronous transfer mode (ATM) system also causes the similar overflow resulted from using a packet referred to as a fixed length cell.

As a ATM system uses the fixed length cell, the message longer than the cell length is transmitted in the form of a plurality of divided cells. The ATM system may use a protocol which allows no re-transmission control at every cell. Accordingly, if a certain cell is disposed of, the message containing the disposed cell is rejected. Such an ATM system requires re-transmission of not only disposed cell, but all the cells in the message. Especially when the buffer is congested, all the call cells using the buffer may be disposed of due to overflow.

Conventional methods have been introduced to control the congestion, for example, a method for randomly selecting n pieces of cells to be disposed from N pieces of arriving cells, or a method for disposing the cell in accordance with a preset priority order (in "Congestion control method in ATM network" B-481, Electronic Communication Society, Spring conference, 1991).

Quality as an interest of users is directly influenced by a message disposing ratio, not a cell disposing ratio. The message disposing ratio, similar to the cell disposing ratio, is defined as the number of received messages (MR) to the number of sent message (MS), i.e., MR/MS.

The aforementioned congestion control method may intensify the possibility to disperse disposed cells into a plurality of messages. For example, it is assumed that one message is divided into 10 cells and there are 10 virtual circuits for sending the message. Supposing that the cell disposing ratio is 0.1, i.e., 10 out of 100 cells are inevitably disposed, if each of 10 the disposed cells is respectively dispersed in 10 messages, the message disposing ratio would be 1.

If disposed cells are dispersed in many messages, all the messages containing the disposed cells are re-transmitted, thus substantially decreasing throughput of the network.

SUMMARY OF THE INVENTION

It is an object of the present invention to provide an method and apparatus for concentrating cells to be disposed of to a specific call selected depending on each communication status thereof and thereby prevent a message disposing ratio from being deteriorated irrespective of the cell disposing ratio.

An object of the present invention is achieved by a priority control method of a virtual circuit (VC) that controls a priority order of a plurality of virtual circuits that are supplied to a buffer, comprising the steps of: monitoring the state of utilization of the buffer; and selecting an arbitrary virtual circuit from among the plurality of virtual circuits and giving the selected virtual circuit a lower priority order, when the buffer is in congestion.

Moreover, another object of the present invention is achieved by a priority order control device of virtual circuit that controls a priority order of plurality of virtual circuits, comprising: a buffer for receiving cells via the plurality of virtual circuits; means for monitoring the state of utilization of the buffer; control means for selecting an arbitrary virtual circuit from among the plurality of virtual circuits when the buffer is in congestion, and giving the selected virtual circuit a lower priority order; and disposal means for disposing of a cell having been received when the buffer is in congestion and the cell corresponds to said selected virtual circuit.

The present invention is so designed to dispose of the input cell when the buffer is partially congested, and to further dispose the succeeding cells (with the same virtual circuit identifier) to eliminate the congestion with the aid of the effect equivalent to that for temporarily decreasing the load. As a result, the other undisposed VC cells can be protected.

This invention serves to eliminate the overload condition by decreasing the cell disposing ratio of cells on the VC other than that on the specific VC so as to decrease the message disposing ratio. In this invention, a certain VC is selected at overload or the state of congestion of the buffer, so that cells thereon are given a lower priority order. For example, even when the buffer has vacancy, the cells on the selected VC are rejected by the buffer and disposed of, which decreases the inputting load exerted to the buffer, thus eliminating overload or congestion.

The cells of the other VCs are processed in the same manner as in the case of being input to the buffer under normal load, thus decreasing the disposing ratio.

Concentrating cells on the specific VC to be disposed of increases the message disposing ratio of the specific VC. However the message disposing ratios of the other VCs are decreased. As a result, the present invention decreases the message disposing ratio of the system as a whole.

BRIEF DESCRIPTION OF THE DRAWINGS

This and other objects, features and advantages of the present invention will become more apparent upon a reading of the following detailed description and drawings, in which:

FIG. 2 is an explanatory view of a buffer 301;

FIG. 3 is an explanatory view of an FT303;

FIG. 5 is an explanatory view of a mechanism of a prior art;

DESCRIPTION OF THE PREFERRED EMBODIMENTS

Embodiments of the present invention are described referring to drawings.

Figure 1:
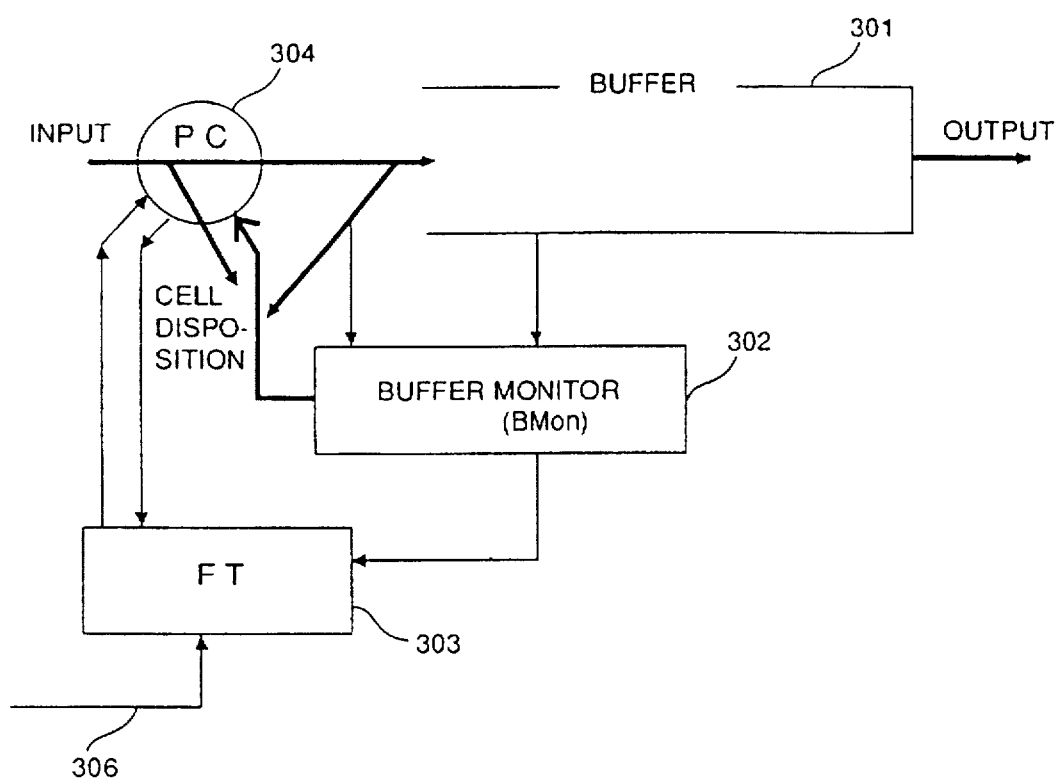
FIG. 1 is a block diagram of a first embodiment.

FIG. 1 is a block diagram of the present invention.

In FIG. 1, a reference numeral 301 is a buffer supplied with a plurality of virtual circuits (hereinafter referred to as VC).

A reference numeral 302 is a buffer monitor (hereinafter referred to as BMon 302) for monitoring the service condition of the buffer 301 to detect congestion and eliminate the state of congestion of the buffer. The BMon 302 monitors disposed cells due to overflow of the buffer 301.

A reference numeral 303 is a forwarding table (hereinafter referred to as FT 303) used for selecting a certain VC to be given a lower priority order at the state of congestion, and for returning the priority order of the second VC to its original priority order when the state of congestion is eliminated.

A reference numeral 304 is a priority control (hereinafter referred to as PC 304) provided in an input part of the buffer 301. The cells of each VC, that have individual virtual circuit identifiers (hereinafter referred to as VCI), arrive at the PC 304. Before inputting those cells to the buffer 301, the PC 304 transfers the VCI of the cell to the FT 303 and processes the cell in compliance with the instruction of the FT 303.

Next, detection of congestion and the state that congestion is eliminated in the buffer 301 and processing method of the cell are described.

As FIG. 2 shows, the BMon 302 monitors the content amount W of the buffer 301 in relation with a threshold value Xon, a threshold value Xoff, and a threshold value Y.

When the buffer 301 contains cells of W, the signal XXon is set to ON if $Xon \leq W$, and the signal XXon is set to OFF if $W < Xon$. The buffer 301 sets the signal XXoff to ON if $Xoff \leq W$, and sets the signal XXoff to OFF if $W < Xoff$. It sets the signal YY to ON if $Y \leq W$, and to OFF if $W < Y$.

When the signal XXon has changed from OFF to ON, the BMon 302 determines this state as being congested, and outputs a congestion detection signal. When the signal XXoff has changed from ON to OFF, the BMon 302 determines that the state of congestion has been eliminated, and outputs a congestion eliminated detection signal. The BMon 302 further transmits ON/OFF information of the signal YY to the PC 304.

Responding to the congestion detection signal from the BMon 302, FT 303 selects some cells (hereinafter referred to as "specified cells") from those arriving at the PC 304 in the state of congestion based on the VCI from the PC 304. As FIG. 3 shows, the FT 303 writes "none" in an admission area of the VCI of the forwarding table (hereinafter referred to as FT) corresponding to the specified cells. If the cells sent to the buffer 301 are disposed of due to buffer overflow, the FT 303 sets all the disposed cells as specified cells based on the disposed cell information sent from the BMon 302, and writes "none" in the admission area of the VCI corresponding to the specified cells. While if receiving a congestion eliminated detection signal from the BMon 302, the FT 303 writes "OK" in the admission area of all the VCI. In case the VC is newly set, the FT 303 writes a new VCI number corresponding to the set VC through the signal line 306 to the VCI area, and writes "OK" in the admission area of the VCI number. Upon finishing the VC, the FT 303 erases the VCI number and contents of the admission area corresponding to the VC.

When the cell has arrived during the signal YY is ON, the PC 304 searches over the FT admission area of the FT 303. If the admission area corresponding to the VCI of the received cell is written as "none", the cell is disposed without being output to the buffer 301. While if the admission area corresponding to the VCI of the received cell is written as OK, the cell is output to the buffer 301. If the signal YY is OFF, all the received cells are output to the buffer 301.

Figure 4:
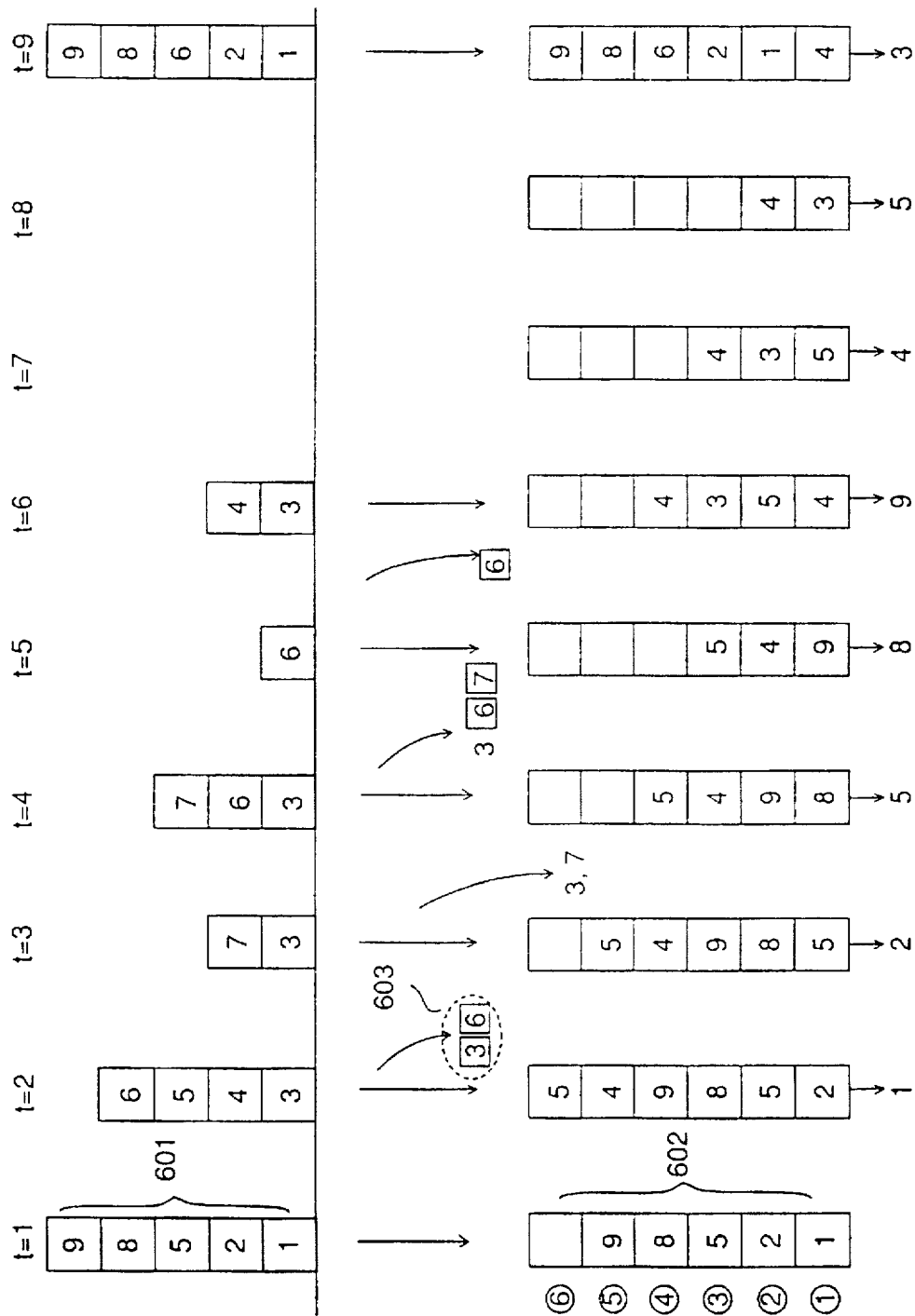
FIG. 4 is an explanatory view of a mechanism of the first embodiment.

More specific mechanism is described referring to FIG. 4.

Here, it is assumed that the buffer 301 is supplied with 9 VCs with a capacity of 6 cells. Among those cells which arrived during detecting congestion, only a cell with the smallest VCI is selected to be a specified cell. The VC corresponding to the specified cell is processed in a lower priority order. In case of a plurality of cells which arrive, including the one selected as the specified cell, only a cell with the smallest VCI is selected to be a specified cell except the one which has been already selected as the specified cell. The VC corresponding to the specified cell is processed in a lower priority order.

In this example, the threshold value Xon is an address number 5, the threshold value Xoff is an address number 3, and the threshold value Y is an address number 4.

Each of 9 VCs transfers one message which is divided into a plurality of cells for transmission thereon. In FIG. 4, arrival conditions of cells 601 shows that the cells of VCI=1, 2, 5, 8, 9 arrive at the buffer simultaneously at a time (t=1) from an input line, for example. Buffer conditions 602 shows that a space for only one cell is left because 5 cells, 1, 2, 5, 8, 9 have already occupied the buffer 301 to be serviced sequentially forward through, for example, FIFO in the buffer 301 with the capacity of 6 cells. The cell outside the buffer, the cell 603, is the disposed cell.

When cells of VCI=1, 2, 5, 8, 9 arrive at the buffer 301 simultaneously at a time (t=1) from an input line, the buffer 301 becomes occupied up to the address number 5. Then the signals XXon and YY are turned to be ON, and the BMon 302 determines that the buffer is in congestion and outputs a congestion detection signal.

When cells of VCI=3, 4, 5, 6 arrive at the buffer 301 simultaneously at a time (t=2) from an input line, the FT 303 writes "none" in the admission area of VCI=3 in order to give a lower priority order to cells of VCI=3 in response to the congestion detection signal. The PC 304 recognizes the received cell of VCI=3 as a specified cell and disposes of it. The rest of the cells, VCI=4, 5, 6 are output to the buffer 301, and the cell of VCI=6 is disposed of because of overflow. Then the BMon 302 outputs the cell information on the disposed cell of VCI=6 to the FT 303. The FT 303 writes "none" in the admission area of the VCI=6 in order to give a lower priority order to cells of VCI=6.

When cells of VCI=3, 7 arrive at the buffer 301 simultaneously at a time (t=3) from an input line, the PC 304 checks the cells of VCI=3, 7 since the signal YY is set to ON. Because the admission area of VCI=3 of the FT is written as "none", the cell of VCI=3 is disposed of. The buffer 301 is kept congested yet, the FT 303 processes the cell of VCI=7 in a lower priority order and writes "none" in the admission area of the cell of VCI=7. The PC 304 disposes of the cell of VCI=7.

When cells of VCI=3, 6, 7 arrive in at the buffer simultaneously at a time (t=4) from an input line, the PC 304 checks the cells of VCI=3, 6, 7 since the signal YY is kept ON. The admission area of the cells of VCI=3, 6, 7 of the FT is written as "none", so the cells of VCI=3, 6, 7 are disposed of.

When a cell of VCI=6 arrives at the buffer at a time (t=5) from an input line, the PC 304 checks the cell of VCI=6 since the signal YY is kept ON. The admission area of the VCI=6 is written as "none", so the cell of VCI=6 is disposed. After disposing the cell of VCI=6, the buffer 301 is occupied up to the address number 3, thus changing the signal YY to OFF.

When the cells of VCI=3, 4 arrive a the buffer at a time (t=6) simultaneously from an input line, the PC304 outputs them to the buffer 301 without checking since the signal YY is kept OFF. Inputting cells of VC=3, 4 serves to set the signal YY to ON, again.

Since no cell arrives at a time (t=7, 8), the buffer 301 is occupied up to the address number 2. As the signal XXoff changes to be OFF, the BMon 302 determines that the state of congestion has been eliminated, and outputs a congestion eliminated detection signal. At the same time, the signal YY is set to OFF. The FT 303 receives the congestion eliminated detection signal and writes "OK" in the admission area of cells of VCI=3, 6, 7 to return VCI=3, 6,7 to their original priority order.

When cells of VCI=1, 2, 6, 8, 9 arrive in the buffer at a time (t=9) simultaneously from an input line, the PC 304 outputs them to the buffer 301 without checking since the signal YY is kept OFF.

A prior art method is discussed in connection with the same arrival conditions of cells from FIG. 4 for the purpose of comparison.

FIG. 5 is an explanatory view showing a function of the prior art.

The prior art causes buffer overflow at each time t of 2, 3, 4, 6, and 9.

In the prior art, the cell to be disposed of at the buffer overflow is randomly selected at every overflow.

As a result, 8 cells of VCI=5, 6, 7, 6, 7, 4, 8, 9 are disposed of. The message disposing ratio at this time is 6/9, that is, 6 messages (VCI=4, 5, 6, 7, 8, 9) within 9 messages are disposed of.

In the present invention, 8 cells of VCI=3, 6, 3, 7, 3, 6, 7 are disposed of. The message disposing ratio at this time is 3/9, that is, 3 messages (VCI=3, 6, 7) within 9 messages are disposed of.

The present invention substantially improves the message disposing ratio, and provides a user with greatly improved communication quality.

The first embodiment uses a method for selecting the specified cell where only one cell with the smallest VCI is selected from those received during detecting congestion. However the cell of VCI with a greater value may be applicable. A plurality of cells may also be selected. Alternatively the method for selecting the cell randomly, or selecting the cell according to the priority order of the VCI may be available.

The quantity of selected cells may be random, or the quantity may be a predetermined value. All the cells to be disposed of may be selected.

Figure 6:
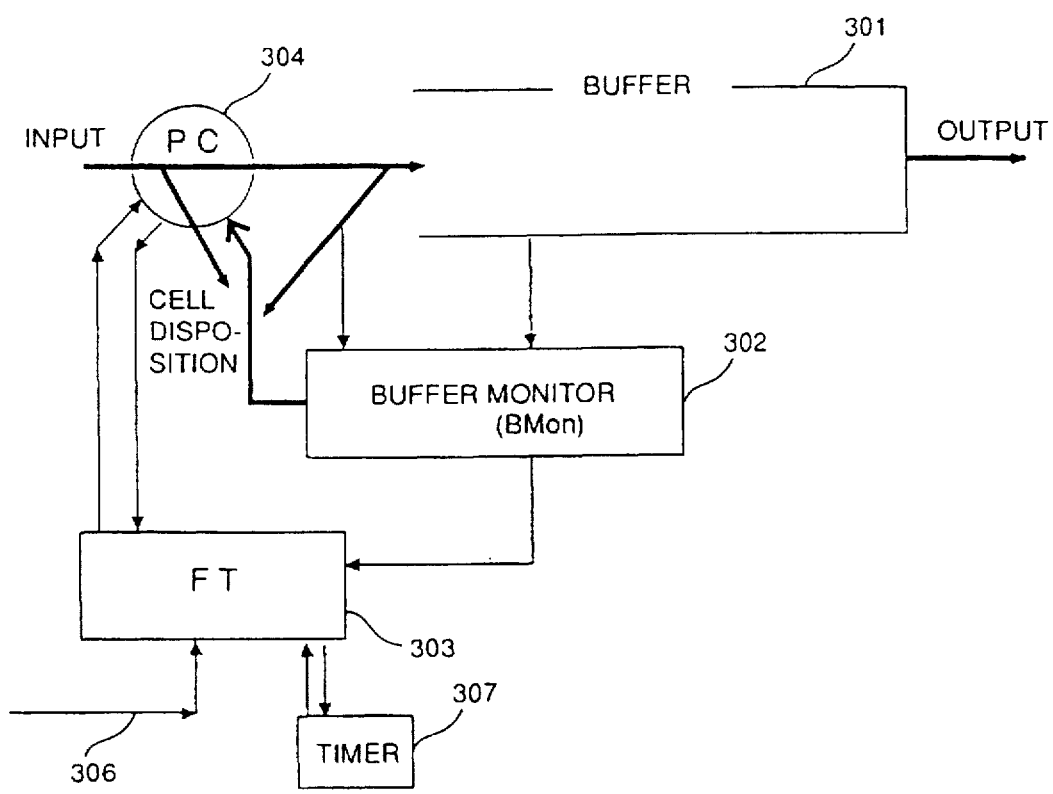
FIG. 6 is a block diagram of a second embodiment.

Next, a second embodiment is described. Functions of the second embodiment are the same as those in the first embodiment. However, the following functions are added thereto. Referring to FIG. 6, a timer 307 is connected to the FT 303. The timer 307 clocks at every VC beginning from writing of "none" in the admission area. After a lapse of a time predetermined by a system at every VC, "OK" is written into the admission area of the VC number in the same manner as the VC setting.

This embodiment, dynamically concentrating the cell to be disposed of to a specific VC with priority control, also dynamically determines the VC to be specified depending on actual communication conditions, which prevents rise of load and fall of throughput due to re-transmission, resulting in efficient communication.

A third embodiment is resulted from simplifying the first embodiment.

The FT 303 has no function for selecting a specified cell. Based on the VCI of the disposed cell sent from the buffer monitor 302, "none" is simply written in the admission area corresponding to the disposed cell in the same way as the first embodiment. When congestion is eliminated, "OK" is written in the admission area in similar way to the first embodiment. Functions of BMon 302 and PC 304 are the same as those of the first embodiment.

Figure 7:
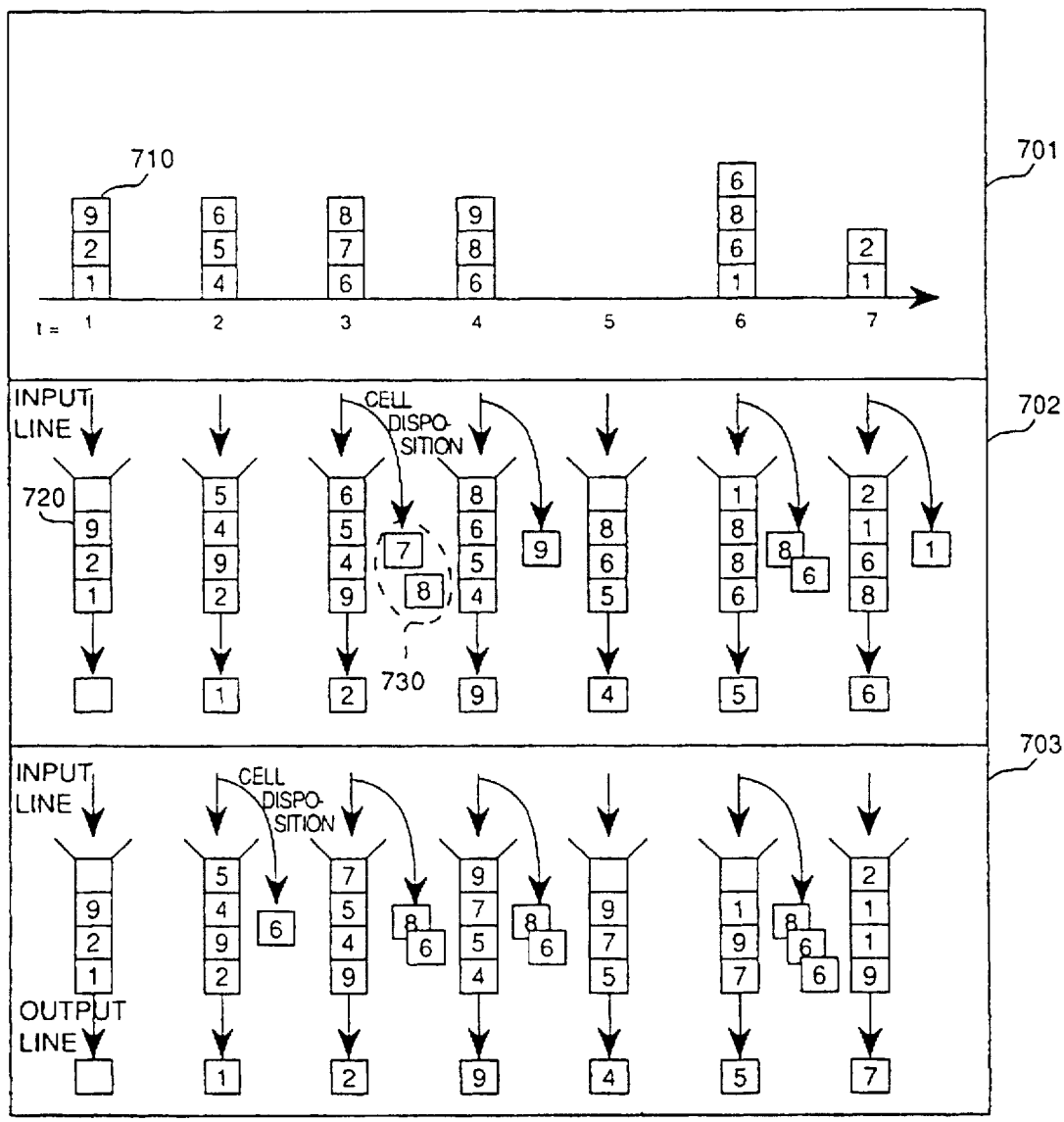
FIG. 7 is an explanatory view of a mechanism of a third embodiment.

Operation of the third embodiment is described referring to FIG. 7.

It is assumed to use a buffer multiplied with 9 VCs with its capacity of 4 cells. Each of 9 VCs transfers one message divided into a plurality of cells thereon.

In FIG. 7, arrival conditions of the cell 701 shows that 3 cells of VCI=1, 2, 9 arrive at the buffer at a time (t=1) simultaneously from an input line. Buffer conditions 702 shows that the buffer 301 becomes occupied with 3 cells of 1, 2, 9, to be serviced sequentially forward through, for example, a FIFO, and the space for only one cell is left in the buffer 301 since the capacity of the buffer 720 is for 4 cells. The cell outside the buffer, the cell 730, is a disposed cell.

Referring to FIG. 7, a prior art method may cause buffer overflow at each time (t=3, 4, 6, 7) as shown in the state of the buffer 702. The cell disposed of at the buffer overflow may be randomly selected at every overflow. The state of the buffer 702 shows the content of the buffer and disposing condition of the cell in the prior art case where disposed cells are randomly selected.

As the state of the buffer 702 shows, the message disposing ratio of 5 disposed messages in 9 messages is defined as 5/9, since cells of VCI=7, 8, 9, 6, 1 are disposed.

A state of the buffer 703 of the present invention is now described. In the state of the buffer 703, a cell of VCI=6 is disposed of at a time (t=2) due to overflow. Additionally a cell of VCI=8 is disposed of at a time (t=3) due to overflow. At a time (t=6), the cells of VC=6, 8 as those in the message which have been already disposed are also disposed in spite of vacancy of the buffer. At a time (t=7), undisposed cells of VCI=1, 2 may be output to the buffer. As a result, although 8 cells are disposed of as shown in the state of the buffer 703 of FIG. 7, they are only 2 kinds, the cells of VCI=6 and 8. So, the message disposal ratio results in 2/9.

Thus, the present invention greatly improves the message disposing ratio and provides a user with a greatly improved communication quality.

What is claimed is:

1. A method of controlling a priority order of a plurality of virtual circuits that are supplied to a buffer, comprising the steps of:

monitoring a state of utilization of said buffer; and selecting an arbitrary virtual circuit from among said plurality of virtual circuits and giving the selected virtual circuit a lower priority order, when said buffer is in a state of congestion; and returning a priority order of the selected virtual circuit given the lower priority order to its original priority order when the state of congestion of said buffer has been eliminated.

2. A method of controlling a priority order of a plurality of virtual circuits that are supplied to a buffer, comprising the steps of:

monitoring a state of utilization of said buffer; and selecting an arbitrary virtual circuit from among said plurality of virtual circuits and giving the selected virtual circuit a lower priority order, when said buffer is in a state of congestion; and returning a priority order of the selected virtual circuit given the lower priority order to its original priority order after a lapse of a predetermined time, irrespective of the state of utilization of said buffer.

3. A method of controlling a priority order of a plurality of virtual circuits that are supplied to a buffer, comprising the steps of:

monitoring a state of utilization of said buffer; and selecting an arbitrary virtual circuit from among said plurality of virtual circuits and giving the selected virtual circuit a lower priority order, when said buffer is in a state of congestion, wherein said step of giving a virtual circuit a lower priority order comprises the steps of:

selecting an arbitrary cell from among cells received via said virtual circuits when said buffer is in the state of congestion;

selecting a virtual circuit corresponding to the selected cell; and disposing of said selected cell and subsequently received cells without inputting them into said buffer if said subsequently received cells are received when said buffer is in the state of congestion and correspond to said selected virtual circuit, and wherein said step of selecting said arbitrary cell comprises a step of selecting a predetermined number of cells in order of a circuit identifier corresponding to a virtual circuit from small to large from among cells received via said plurality of virtual circuits when said buffer is in the state of congestion.

4. A method of controlling a priority order of a plurality of virtual circuits that are supplied to a buffer, comprising the steps of:

monitoring a state of utilization of said buffer; and selecting an arbitrary virtual circuit from among said plurality of virtual circuits and giving the selected virtual circuit a lower priority order, when said buffer is in a state of congestion, wherein said step of giving a virtual circuit a lower priority order comprises the steps of:

selecting an arbitrary cell from among cells received via said virtual circuits when said buffer is in the state of congestion;

selecting a virtual circuit corresponding to the selected cell; and disposing of said selected cell and subsequently received cells without inputting them into said buffer if said subsequently received cells are received when said buffer is in the state of congestion and correspond to said selected virtual circuit, and wherein said step of selecting said arbitrary cell comprises a step of selecting a predetermined number of cells in order of a circuit identifier corresponding to a virtual circuit from large to small from among cells having been received via said plurality of virtual circuits when said buffer is in the state of congestion.

5. A priority order control device that controls a priority order of a plurality of virtual circuits, comprising:

a buffer for receiving cells via said plurality of virtual circuits;

means for monitoring a state of utilization of said buffer;

control means for selecting an arbitrary virtual circuit from among said plurality of virtual circuits when said buffer is in a state of congestion, and giving said selected virtual circuit a lower priority order; and disposal means for disposing of a cell received when said buffer is in the state of congestion if said received cell corresponds to said selected virtual circuit, wherein said control means further comprises means for returning a priority order of said selected virtual circuit given the lower priority order to its original priority order when the state of congestion of said buffer is eliminated.

6. A priority order control device that controls a priority order of a plurality of virtual circuits, comprising:

a buffer for receiving cells via said plurality of virtual circuits;

means for monitoring a state of utilization of said buffer;

control means for selecting an arbitrary virtual circuit from among said plurality of virtual circuits when said buffer is in a state of congestion, and giving said selected virtual circuit a lower priority order; and disposal means for disposing of a received cell when said buffer is in the state of congestion if said received cell corresponds to said selected virtual circuit, wherein said control means further comprises means for returning a priority order of the selected virtual circuit given the lower priority order to its original priority order after a lapse of a predetermined time, irrespective of the state of utilization of said buffer.

7. A priority order control device that controls a priority order of a plurality of virtual circuits, comprising:

a buffer for receiving cells via said plurality of virtual circuits;

means for monitoring a state of utilization of said buffer;

control means for selecting an arbitrary virtual circuit from among said plurality of virtual circuits when said buffer is in a state of congestion, and giving said selected virtual circuit a lower priority order; and disposal means for disposing of a received cell when said buffer is in the state of congestion if said received cell corresponds to said selected virtual circuit, wherein said control means further comprises means for selecting an arbitrary cell from among cells which arrived when said buffer is in the state of congestion, and giving a lower priority order to a virtual circuit corresponding to said selected cell, and wherein said means for selecting the arbitrary cell comprises means for selecting a predetermined number of cells in order of a circuit identifier corresponding to a virtual circuit from small to large from among cells received via said plurality of virtual circuits when said buffer is in the state of congestion.

8. A priority order control device that controls a priority order of a plurality of virtual circuits, comprising:

a buffer for receiving cells via said plurality of virtual circuits;

means for monitoring a state of utilization of said buffer;

control means for selecting an arbitrary virtual circuit from among said plurality of virtual circuits when said buffer is in a state of congestion, and giving said selected virtual circuit a lower priority order; and disposal means for disposing of a received cell when said buffer is in the state of congestion if said received cell corresponds to said selected virtual circuit, wherein said control means further comprises means for selecting an arbitrary cell from among cells which arrived when said buffer is in the state of congestion, and giving a lower priority order to a virtual circuit corresponding to said selected cell, and wherein said means for selecting the arbitrary cell comprises means for selecting a predetermined number of cells in order of a circuit identifier corresponding to a virtual circuit from large to small from among cells received via said plurality of virtual circuits when said buffer is in the state of congestion.

9. A priority order control device that controls a priority order of a plurality of virtual circuits, comprising:

a buffer for receiving cells via said plurality of virtual circuits;

first detection means for detecting a state of congestion and elimination of the state of congestion of said buffer and outputting a detection signal;

second detection means for detecting a cell having been disposed of due to overflow of said buffer and outputting cell information of said detected cell;

control means having:
- means for storing circuit identifiers of said plurality of virtual circuits and having admission areas corresponding to said circuit identifiers;
- means for selecting an arbitrary cell from among cells which arrived when said buffer is in a state of congestion;
- means for writing information, "to be given a lower priority order", in an admission area of a circuit identifier of a virtual circuit corresponding to the selected cell, and writing information, "to be given a lower priority order", in an admission area of a circuit identifier of a virtual circuit corresponding to a cell being disposed based on said cell information, when said detection signal indicates the state of congestion;
- means for deleting said information, "to be given a lower priority order", in an admission area when said detection signal indicates elimination of the state of congestion; and
- disposal means for comparing a circuit identifier of a virtual circuit of a cell which arrived when said buffer is in the state of congestion and a corresponding admission area of said control means, and disposing of the arrived cell if the corresponding admission area is written with the information "to be given a lower priority order".

10. The priority order control device of claim 9, wherein said control means comprises means for selecting a predetermined number of cells in order of a circuit identifier corresponding to a virtual circuit from small to large from among cells received via said plurality of virtual circuits when said buffer is in the state of congestion.

11. The priority order control device of claim 9, wherein said control means comprises means for selecting a predetermined number of cells in order of a circuit identifier corresponding to a virtual circuit from large to small from among cells received via said plurality of virtual circuits when said buffer is in the state of congestion.

12. The priority order control device of claim 9, wherein said control means comprises means for selecting a cell corresponding to a cell having a priority order which is low from among cells received via said plurality of virtual circuits when said buffer is in the state of congestion, wherein the priority order of said plurality of virtual circuits is determined in advance.

13. The priority order control device of claim 9, wherein said control means further comprises means for writing information, "to be given a lower priority order", in an admission area, and deleting the written information, "to be given a lower priority order", in the admission area after a lapse of a predetermined time.

14. The method of claim 1, wherein the state of congestion is determined in accordance with a utilization of said buffer exceeding a first threshold, said first threshold being less than a full capacity of said buffer.

15. A method of controlling a priority order of a plurality of virtual circuits that are supplied to a buffer, comprising the steps of:

monitoring a state of utilization of said buffer; and selecting an arbitrary virtual circuit from among said plurality of virtual circuits and giving the selected virtual circuit a lower priority order, when said buffer is in a state of congestion, wherein the state of congestion is determined in accordance with a utilization of said buffer exceeding a first threshold, said first threshold being less than a full capacity of said buffer, and wherein the state of congestion is maintained so long as a utilization of said buffer exceeds a second threshold, said second threshold being less than said first threshold.

* * * * *